UNITED STATES PATENT OFFICE.

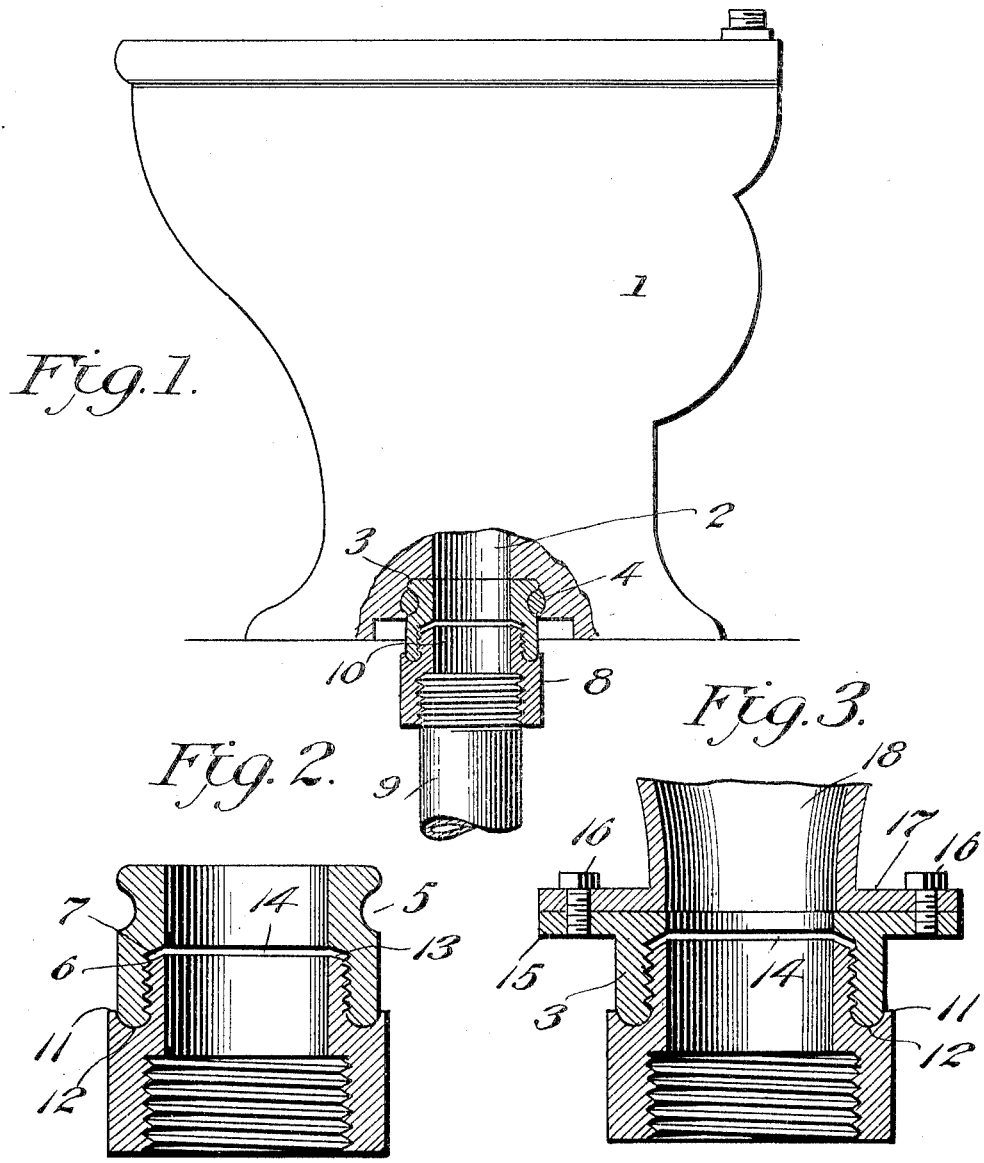

ROBERT HAIRE, OF NEWPORT, RHODE ISLAND.

PIPE CONNECTION.

No. 802,856.   Specification of Letters Patent.   Patented Oct. 24, 1905.

Application filed April 25, 1905. Serial No. 257,346.

*To all whom it may concern:*

Be it known that I, ROBERT HAIRE, a citizen of the United States, residing at Newport, in the county of Newport and State of Rhode Island, have invented new and useful Improvements in Pipe Connections, of which the following is a specification.

This invention relates to pipe connections designed especially for coupling the discharge-pipe with a water-closet bowl, and has for its objects to produce a comparatively simple inexpensive device of this character which insures a firm secure coupling between said parts, one wherein the discharge-pipe may be readily disconnected when the circumstances require, and one in which the leakage at the joint may be readily detected.

With these and other objects in view the invention comprises the novel features of construction and combination of parts more fully hereinafter described.

In the accompanying drawings, Figure 1 is a side elevation, partly in section, of the connection embodying the invention. Fig. 2 is a centrally longitudinal section, on an enlarged scale, of the coupling member or thimble. Fig. 3 is a similar view showing a slightly-modified form of the device.

Referring to the drawings, 1 designates a closet-bowl having a discharge-opening 2, enlarged at its lower end for the reception of a tubular sleeve or nozzle 3, preferably secured in place by means of a filling 4, of lead or other suitable material received by registering grooves 5, formed marginally around the sleeve 3 and body of the bowl 1, there being formed upon the interior of the sleeve and throughout a portion of its length threads 6, terminating adjacent the longitudinal center of the sleeve in an upwardly and outwardly inclined peripheral flange or shoulder 7.

Connected to the bowl 1 by means of a tubular coupling member or thimble 8 is a discharge-pipe 9, having its upper end threaded into said thimble, which latter is in turn provided with a reduced portion or neck 10, externally threaded for engagement with the internal threads 6 of the nozzle 3, there being produced around the thimble at the juncture of its body portion a reduced neck and bearing flange or shoulder 11, having formed therein a marginal groove or recess 12 of substantially semicircular form in cross-section designed to receive the adjacent and correspondingly-shaped end of the nozzle whereby a tight joint or connection is insured between the coupling member and nozzle. It may be mentioned in this connection that the groove 12 constitutes a seat and that the end of the nozzle is in practice ground to said seat for effecting a water-tight joint, and, furthermore, that the inner end of the coupling member is beveled or inclined, as at 13, to accord with the inclined flange or shoulder within the nozzle, it being observed, however, that when the parts are coupled the beveled end 13 of the neck is suitably spaced from the shoulder 7, thereby presenting between said parts an upwardly and outwardly opening marginal recess 14.

In practice when the parts are coupled, as seen in Fig. 1, the opening or recess 14 becomes filled with water, which in the event of the joint becoming loose will leak therethrough, thus insuring a ready detection of a defective connection, which may, owing to the simplicity of the coupling and absence of packing, be readily corrected.

In Fig. 3 the construction and operation of the device are identical with that above described, except that the sleeve or nozzle 3 is equipped with an outstanding horizontal flange 15, adapted for connection by fastening members or bolts 16 with a corresponding flange 17, formed at the discharge end of an old-style closet-bowl 18.

From the foregoing it is apparent that I produce a comparatively simple and inexpensive device admirably adapted for the attainment of the ends in view, it being understood that minor changes in the details herein set forth may be resorted to without departing from the spirit of the invention.

Having thus described my invention, what I claim, and desire to secure by Letters Patent, is—

1. In a device of the class described, a sleeve or nozzle having an internally-threaded portion, a coupling-thimble having a reduced neck in threaded engagement with said nozzle and a seat for the end of the latter, and a pipe operatively connected with said coupling member, there being provided within the nozzle and at the inner terminal of the coupling a marginal upwardly and outwardly opening recess for the purpose above described.

2. In a device of the class described, a bowl having a discharge-opening, a nozzle connected with the bowl at its discharge-opening, a coupling-sleeve having a reduced neck in threaded engagement with the nozzle and a shoulder provided with a marginal groove constituting a seat for the adjacent end of said nozzle, and a discharge-pipe connected with the coupling member there being provided at the inner end of the latter and within the nozzle a marginal place or recess adapted for communication with the joint between the nozzle and coupling-sleeve.

In testimony whereof I affix my signature in presence of two witnesses.

ROBERT HAIRE.

Witnesses:
  JOHN HENRY TILLEY,
  ANDREW HALPIN.